United States Patent Office

3,131,211
Patented Apr. 28, 1964

3,131,211
ALPHA-HYDROXYGLUTARO-NITRILE AND PREPARATION THEREOF
George A. Kurhajec, Orinda, and Donald S. La France, Concord, Calif., assignors to Shell Oil Company, New York, N.Y., a corporation of Delaware
No Drawing. Filed Dec. 8, 1960, Ser. No. 74,454
2 Claims. (Cl. 260—465.6)

This invention relates to a novel dicyanohydrin having two cyano groups and one hydroxyl group and to a process for its preparation. More particularly, it relates to alpha-hydroxyglutaronitrile and to a process for its preparation.

An object of this invention is to provide a new and useful dicyanohydrin and a novel process for its preparation. Another object is that of providing alpha-hydroxyglutaronitrile as a new composition of matter. A further object is that of providing a process for the liquid phase preparation of alpha-hydroxyglutaronitrile from acrolein and cyanide ion. A still further object is to provide alpha-hydroxyglutaronitrile as a useful chemical intermediate in the organic synthesis of other chemical intermediates and useful end products obtained therefrom. A specific object is to provide alpha-hydroxyglutaronitrile as a chemical intermediate in the synthesis of glutamic acid. Other objects of this invention will be apparent to those skilled in the art to which this invention pertains from the ensuing description thereof.

It is known that aliphatic dinitriles such as, for example, adiponitrile(1,4-dicyanobutane) can be prepared from 1,4-dichlorobutane by metathetical reaction with sodium cyanide. Moreover, it is known that alpha-hydroxynitriles (cyanohydrins) such as, for example, lactonitrile (2-hydroxypropionitrile) may be formed by the reaction of hydrogen cyanide on aldehydes or ketones in the presence of trace amounts of alkali. Furthermore, it is known that alpha,beta-olefinically unsaturated aldehydes such as, for example, acrolein, will readily react with hydrogen cyanide or an alkali metal cyanide to form acrolein cyanohydrin. However, the reaction of hydrogen cyanide with either acrolein or acrolein cyanohydrin to form alpha-hydroxyglutaronitrile has not previously been effectively accomplished to our knowledge. Previous workers in this area have found difficulty in reacting more than one molecule of hydrogen cyanide with acrolein and have thus obtained substantially only acrolein cyanohydrin.

It has now been found that acrolein will react with hydrogen cyanide in the presence of a catalytic amount of an alkali metal cyanide to form predominantly alpha-hydroxyglutaronitrile as the end product. This reaction results in the addition of two equivalents of hydrogen cyanide per mole of acrolein.

More specifically, alpha-hydroxyglutaronitrile may be obtained according to the process of this invention by the reaction of acrolein with an alkali metal cyanide in aqueous media, by reaction with hydrogen cyanide in aqueous media using a catalytic amount of an alkali metal cyanide, or by reaction with hydrogen cyanide in non aqueous media using catalytic amounts of an alkali metal cyanide, alkoxide, amino or ammonium base.

In general, acrolein is mixed with an aqueous solution of an alkali cyanide in a reaction vessel, e.g., a thermostated pipeline reactor, suitablefor the control of the reaction temperature within the range of from about 20° C. to about 100° C., but preferably within the range of from about 30° C. to 60° C., using an excess of alkali cyanide and most preferably about 6 to 8 moles per mole of acrolein or an essentially saturated solution in water, thereby resulting in a pH of from about 12 to about 12.5. The reaction time is preferably in the order of from about 15 to 60 seconds in the preferred temperature range but may be increased or decreased in compensation for concomitant departures from the preferred temperature range. Acrolein cyanohydrin may be employed as well as acrolein and it is found convenient to first react acrolein with aqueous alkali cyanide at a low temperature, e.g., about 0° C., to form a premix containing acrolein cyanohydrin which is then converted to alpha-hydroxyglutaronitrile. It is advantageous to continuously adjust the pH of the effluent product solution which is highly alkaline to the neutral point or slightly on the acidic side or to a pH of from about 6 to about 7, and most preferably to a pH of about 6. The reagents and the end product all are sensitive to the presence of excess acidity or basicity and additionally are sensitive to heat, especially over a prolonged period of time, particularly alpha-hydroxyglutaronitrile, which is unstable in the presence of heat. The thermal instability of alpha-hydroxyglutaronitrile may lead to undesirable side reactions and reduce yields of alpha-hydroxyglutaronitrile. The success of the process described herein is, therefore, coupled with the correlation of the reaction temperature and residence time with the avoidance of elevated temperatures and excessive acidity and basicity at all points other than the reaction zone, as far as is practicable. The neutralized product solution resulting from this process may be utilized directly in subsequent reactions or the alpha-hydroxyglutaronitrile may be recovered by extraction, reduced pressure evaporation and similar steps as described herein in Examples I–IV.

The reaction to form alpha-hydroxyglutaronitrile does not proceed readily when temperatures below about 20° C. are employed or when the pH of the reactant solution is much lower than about 12. For example, when carried out as in Examples I and II, but at about 0° C., the end product is acrolein cyanohydrin only and significant amounts of alpha-hydroxyglutaronitrile are not found until the temperature is raised above about 20° C. Again, when the temperature is held at about 45° to about 70° C. but the ratio of alkali cyanide to acrolein is altered by substitution of hydrogen cyanide for part of the alkali cyanide the yield of alpha-hydroxyglutaronitrile is substantially reduced. This was demonstrated by several experiments involving ratios of one mole of acrolein, 0.7 to 2.0 moles of sodium cyanide, and 6 to 4 moles hydrogen cyanide, respectively. Similarly, when several ratios of ammonia and hydrogen cyanide were employed resulting in a pH in the order of about 9.5 to about 9.8, the end product was principally acrolein cyanohydrin. As shown in Example IV, the reaction can be effected at lower pH and alkali cyanide concentrations when the temperature and/or the residence time are substantially increased. This mode of preparation is generally less desirable since the formation of by-products and polymers is enhanced. When temperatures above about 60° C. were employed, under conditions otherwise as in Examples I and II, increasing amounts of polymeric products were noted.

The reaction of acrolein and hydrogen cyanide in non-aqueous media is very promising as a route to the synthesis of alpha-hydroxyglutaronitrile. Preliminary trials made in absolute ethanol using acrolein and hydrogen cyanide in a mole ratio of about 1:2.1 and a trace of sodium ethoxide catalyst after one hour reaction at 70°–75° C. resulted in a product which was chilled, neutralized with acetic acid, and the ethanol evaporated at 20° C. using reduced pressure. The crude concentrate was acetylated and a distilled cut of alpha-acetoxyglutaronitrile was obtained corresponding to an overall yield of 58% on applied acrolein. The reaction of acrolein with cyanide ion in solvents other than water generally results in superior yields of alpha-hydroxyglutaronitrile over that obtained in aqueous media.

Advantages in the use of non-aqueous solvents are the use of hydrogen cyanide with only trace amounts of catalyst so as to avoid large amounts of salt in the final product, the need for high cyanide ion/acrolein ratios is avoided, easier removal of the solvent phase, and greatly improved product yields. The reaction time required is increased over that needed in aqueous media where high ratios of alkali cyanide were employed. The aqueous phase reaction time using catalytic amounts of alkali cyanide is, however, of the same order as employed with these non-aqueous solvents.

The non-aqueous phase reaction may be conducted in a simple batch reactor or in a continuous pipeline system. It has been effected in the temperature range of from about 42° to 88° C. with residence times of from about 10 to about 90 minutes, depending upon the solvent. In general, the reaction may be accomplished by adding an alkoxide, alkali cyanide, amino or ammonium base catalyst to a solution of acrolein and hydrogen cyanide in a molar ratio of about 1:2 to 1:2.5 in absolute ethanol or in one of the solvents hereinafter described. Alternatively, the acrolein may be added to the solvent phase containing hydrogen cyanide and the catalyst. In the first method an exothermic reaction resulting in acrolein cyanohydrin is observed and cooling is required. In the latter case, the refluxing solvent phase can serve to dissipate this heat of reaction if desired.

Substantially anhydrous solvent phases which promote the reaction to form alpha-hydroxyglutaronitrile rather than acrolein cyanohydrin only, include acetonitrile, ethanol, tert-amyl alcohol, chlorobenzene, toluene, xylene and dimethylformamide. The reaction is slow in the case of anhydrous benzene, dioxane, methanol, tert-butyl alcohol, and methyl tert-butyl ether, leading generally to acrolein cyanohydrin as a major product. These latter solvents, however, can be utilized by using pressure to raise the reflux temperatures or by adding water in amounts of from 0.1% up to 20–30%, as indicated by experiments with tert-butyl alcohol, dioxane and methanol. The preferred solvent phases are acetonitrile, tert-amyl alcohol, dioxane plus water and tert-butyl alcohol plus water. Suitable non-aqueous organic solvents which may be used in the practice of this invention include a wide variety of commonly employed organic solvents such as the alkyl nitriles, e.g., acetonitrile and the like; lower alkanols, e.g., methanol, ethanol, propanol, isopropanol, tert-butyl alcohol, tert-amyl alcohol and the like; lower alkyl ethers, e.g., ethyl ether, methyl tert-butyl ether and the like; aromatic hydrocarbons, e.g., benzene and the like; halo-substituted aromatic hydrocarbons, e.g., chlorobenzene and the like; nitro-substituted aromatic hydrocarbons, e.g., nitrobenzene and the like; alkyl-substituted aromatic hydrocarbons, e.g., toluene, xylene and the like; alkyl hydrocarbons, e.g., octane, and the like; halo-substituted alkyl hydrocarbons, e.g., carbon tetrachloride and the like; cyclic alkyl dioxides, e.g., dioxane, and the like. Also suitable are the above solvents containing small amounts of water such as, for example, dioxane plus 5% water, tert-butyl alcohol plus 5% water, tert-butyl alcohol plus 15% water, methanol plus 15% water, and the like.

Suitable catalysts include the alkaline catalysts such as the alkali metal cyanides, for example, sodium cyanide, potassium cyanide and lithium cyanide; the alkali metals, for example, sodium, potassium and lithium; the alkali metal alkoxides, for example, sodium methoxide, sodium ethoxide, sodium propoxide, sodium isopropoxide, sodium butoxide, sodium pentoxide, potassium ethoxide, potassium propoxide, potassium isopropoxide, lithium propoxide, sodium tert-butoxide, potassium tert-butoxide, lithium tert-butoxide, and the like; and amino and ammonium bases, for example, trimethylamine, triethylamine, tripropylamine, triisopropylamine, tri-tert-butylamine, tetraethylammonium hydroxide, and the like.

Examples VII and XIV are of particular interest in that they offer experimental evidence that beta-cyanopropionaldehyde does not exist as such in the reaction product. Alpha-hydroxyglutaronitrile is the product. Another example is available showing similar results in tert-amyl alcohol when an attempt to remove hydrogen cyanide below the 2:1 ratio of hydrogen cyanide/acrolein was made.

The following examples illustrate the preparation of the novel dicyanohydrin, alpha-hydroxyglutaronitrile, by this invention from acrolein and cyanide ion in the liquid phase. It is to be understood, however, that the examples are merely illustrative and are not to be regarded as limiting since the basic teachings herein may be varied as will be understood by one skilled in the art to which this invention pertains.

*Example I.—Alpha-Hydroxyglutaronitrile*

The reaction was effected in a thermostated pipeline reactor, using the alternative feed method wherein a solution of 20% w. of acrolein in water was pumped to a high velocity mixing inlet at the head of the reactor and there mixed continuously with a stream of 25% w. sodium cyanide solution in water. The pH of the admixed reactants was approximately 12–12.5 and the molar ratio of NaCN to acrolein was about 8:1. The reactants passed through the reaction section comprising a thermostated coil of 20 feet of 1/8" stainless teel tubing. The flow rate was such that a residence time of about 30 seconds was provided and the temperature was held at 43–44° C. The effluent from the reactor passed to a neutralizing reservoir where hydrochloric acid was added continuously at a rate sufficient to adjust the pH to a range of 4–6. In this example the neutralizing reservoir was allowed to attain approximately room temperature and an offtake line was provided leading to a flash evaporator where water was removed continuously at reduced pressure to provide an aqueous concentrated product. The concentrate was then extracted with ethyl ether and the ether was removed from the extract by evaporation to yield a crude substantially non-aqueous product. The infrared spectrum of this concentrated product showed it to be essentially alpha-hydroxyglutaronitrile. Additional confirmation of the identity of the compound was obtained by acetylating the product with acetic anhydride to form the alpha-acetoxyglutaronitrile derivative, which was suitable for gas-liquid chromatography identification at 200° C. in an Apiezon GLC column.

*Example II.—Alpha-Hydroxyglutaronitrile*

503 g. NaCN (9.75 mole) was dissolved in 1407 g. of water and introduced into a premix vessel before entering the pipeline reactor. Freshly distilled acrolein (1.51 mole) was slowly added to the premix vessel, with stirring, over a period of about 20 minutes and at a temperature of 0° C.±5°. The purity of the NaCN and acrolein was such that a molar ratio of about 6.5:1, sodium cyanide to acrolein, resulted in the premix vessel. The premix was pumped through the reactor coil at a rate of 28–30 ml./minute to provide about 30 seconds residence time. The reactor was maintained at 40°±2° C. The effluent passed from the reactor to the neutralizing vessel where it was held at 0°–5° C. and continuously adjusted to a pH of 5–6 with hydrochloric acid. The cold aqueous product was then directly extracted manually with four portions of ethyl ether. The extract was dried over anhydrous calcium sulfate, filtered, and the ether was evaporated off at reduced pressure to yield 62.5 grams of product corresponding to a yield of 37–38% weight based upon the theoretical weight of product anticipated by the reaction of 1.51 moles of applied acrolein with 3.02 moles of cyanide. The aqueous phase remaining after the ether extraction was charged to a vacuum flasher apparatus where water was distilled off at reduced pressure so as to maintain a temperature of not more than 50–60° C. during the concentration.

During this concentration sodium chloride was precipitated and this salt was periodically removed, washed with alcohol, and the alcohol wash returned to the vacuum flasher. By these means 62 grams of product were obtained corresponding an an additional weight yield of 37% based upon the theoretical.

The product from the ether extract phase was shown to be essentially alpha-hydroxyglutaronitrile by comparing its infrared spectrum with the spectrum of a sample of alpha-hydroxyglutaronitrile prepared by another route. Further, this product was acetylated with acetic anhydride to form alpha-acetoxyglutaronitrile and the infrared spectrum was compared with the acetoxy derivative obtained by acetylating a sample of the independently synthesized alpha-hydroxyglutaronitrile with confirmation of the identity of the derivative. Gas-liquid chromatography was also employed to show a positive finding of alpha-acetoxyglutaronitrile derivative from this example by comparison with the authentic sample of independently synthesized alpha-acetoxyglutaronitrile. The product from the aqueous phase obtained as in the above was examined by infrared spectrometry to show that alpha-hydroxy-glutaronitrile was formed.

Infrared spectrometry provides a useful means of identifying the compounds investigated in the process of this invention. Characteristic absorption bands are observed as follows.

Acrolein cyanohydrin: Infrared absorption bands of particular significance are observed at 2.95, 4.45, 10.2, 10.6, 11.6, and 14.85 microns.

Beta-cyanopropionaldehyde: 3.4, 3.5, 3.65, 4.45, 5.8, 9.4, 11.2, 11.9, and 15.2 microns.

Alpha-hydroxyglutaronitrile: 2.95, 3.4, 4.45, 7.7, 10.7, and 11.4 microns.

Alpha-acetoxyglutaronitrile: 3.4, 4.45, 5.7, 7.0, 7.3, 8.1 to 8.4, 9.5, 10.4, 11.35, and 15.1 microns.

It is apparent to one skilled in the art of infrared spectrometry that the shifting of the various absorption bands noted above and their presence or absence, coupled with their intensities, affords a means of identifying these compounds particularly when they are prepared in a relatively pure state or in high concentration as in this work.

*Example III.—Alpha-Hydroxyglutaronitrile*

The reaction of acrolein and NaCN was effected as in Example II, with the exception of the reactor temperature, which was maintained at 35° C., and the substitution of a reactor comprising 10.6 foot length of 3/16" stainless steel tubing in coiled form. The product recovered from the ether extract phase only was acetylated and distilled. Although the acetoxy derivative distilled with some decomposition and the product did not include that portion remaining in the aqueous phase, a distilled cut of alpha-acetoxyglutaronitrile derivative was obtained boiling at approximately 145° C. at 3 mm. (uncorrected) which corresponded to a yield of 29% mole of applied acrolein to the distilled acetoxy derivative of alpha-hydroxyglutaronitrile. Additional confirmation of the formation of alpha-hydroxyglutaronitrile was obtained by the infrared spectrum of the concentrated product from the ether phase and by gas-liquid chromatographic analysis of the acetylated derivative recovered by distillation.

*Example IV.—Alpha-Hydroxyglutaronitrile*

The reaction of acrolein with hydrogen cyanide was also effected in aqueous medium, using only catalytic amounts of sodium cyanide, but at a reduced rate of reaction. A stirred reaction vessel fitted with a reflux condenser was charged with 500 ml. of water, 110 ml. of HCN, and 1.0 gram of NaCN. Acrolein (1 mole) was added slowly to the stirred mixture keeping the temperature below 35° C. After addition of the acrolein, the solution was brought to reflux temperature of 72° C. Refluxing was continued for 25 minutes to a final temperature of 87° C. A sample of the solution was evaporated at reduced pressure and the residue was examined by infrared spectrometry. Some alpha-hydroxyglutaronitrile was shown by the spectrum.

*Example V.—Alpha-Hydroxyglutaronitrile*

An apparatus comprising a reaction vessel fitted with a stirring device, a reflux condenser, thermometer, and a feed vessel, was charged with 500 ml. of substantially anhydrous acetonitrile, 103 ml. of HCN (ca. 2.5 moles), and 72 ml. of fresh acrolein distillate (ca. 1 mole). Two grams of potassium tert-butoxide were cautiously added to the stirred mixture at 10° C. An exothermic reaction occurred which was held below 36° with a cooling bath. The resultant mixture was essentially water-white. The reactants were then brought to reflux temperature (71° C.) in 15 minutes. The mixture was a very light-yellow color at this point. After refluxing for ten minutes, the temperature was 74.5° C. and a small sample was withdrawn. The acetonitrile solvent was evaporated off the sample at reduced pressure and an infrared spectrum obtained on the residue which showed the principal product to be alpha-hydroxyglutaronitrile by comparison with the spectrum of alpha-hydroxyglutaronitrile prepared by another route. The refluxing was discontinued after a total period of 45 minutes and the reactants cooled to 20° C.

To establish the conversion to alpha-hydroxyglutaronitrile at this point the product solution was reacted with an excess of acetic anhydride for two hours at 55–60° C. The solvent phase was then removed at reduced pressure and the residual product distilled to obtain an overhead cut of 90 grams of alpha-acetoxyglutaronitrile derivative, corresponding to an overall yield of 59% mole of applied acrolein to the acetoxy derivative of alpha-hydroxyglutaronitrile. The infrared spectrum of the distillate confirmed the acetoxy derivative. Using a procedure similar to that of this example, but employing a 60-minute reflux period, a yield of 72–75% of alpha-hydroxyglutaronitrile was obtained with acetonitrile as solvent.

*Example VI.—Alpha-Hydroxyglutaronitrile*

The reaction vessel (as in Example V) was charged with 450 ml. of tert-amyl alcohol (containing 0.23% of water), 100 ml. of HCN, and 72 ml. of fresh acrolein distillate (1.0 mole). A catalyst solution comprising 2 grams of potassium tert-butoxide in 50 ml. of tert-amyl alcohol was gradually added to the mixture at −15° C. with stirring. The spontaneous reaction occurring was controlled below 22° C. with cooling. The mixture was warmed to 60° for 15 minutes and then brought to reflux for 11 minutes. The initial reflux temperature was 78° C. and the final, 88° C. After cooling, 2 ml. of acetic acid was added to destroy the catalyst. The solvent phase was removed at 2 mm. pressure and a residual product of 110 grams was obtained. This was acetylated with acetic anhydride and distilled to obtain 94 grams of the acetoxy derivative of alpha-hydroxyglutaronitrile, corresponding to an overall yield of 62% mole on applied acrolein.

*Example VII.—Alpha-Hydroxyglutaronitrile*

The reaction vessel of Example V was modified by adding a short distilling column section with a take-off head and condenser in place of the simple reflux condenser. The vessel was charged with 400 ml. of absolute ethanol, 100 ml. of HCN (2.5 moles) and 0.2 gram of sodium metal. An acrolein/ethanol solution of one mole acrolein in 100 ml. of absolute ethanol was slowly added to the above-stirred reactor mixture at room temperature with sufficient added cooling to maintain the reactants below 30° C. The mixture was warmed to 55°–60° C. for one hour and then refluxed for 35 minutes at 71° to 75° C. The catalyst was quenched at 75° by adding 1.5 ml. of conc. HCl dissolved in 50 ml. of ethanol to the mixture. With continued stirring and refluxing, distillate was then removed at the distilling take-off head over a period of 1¼ hours starting with an initial still-head temperature of 52° C. and finishing with a temperature of 74° C. The reactor vessel mixture rose from 75° to 80° C. during this period. The distillate of 250 ml. ethanol taken over in this period was diluted in aqueous sodium hydroxide and a volhard titration for CN⁻ was made. This showed that only 0.5 mole of HCN was removed overhead during the 1¼ hour distillation period. Accordingly, the reactant mixture remaining contained just two moles of HCN per mole of acrolein applied, corresponding to the theoretical requirement for reaction of both the carbon-carbon double bond and the carbonyl group with HCN to form alpha-hydroxyglutaronitrile. The ethanol was then evaporated from the product mixture at reduced pressure to obtain the concentrated product which weighed 108.5 grams. The theoretical weight for alpha-hydroxyglutaronitrile was 110 grams. An infrared spectrum showed the characteristic features of the spectrum for alpha-hydroxyglutaronitrile. The residual product was then acetylated with acetic anhydride to form the alpha-acetoxyglutaronitrile derivative which was stable enough to undergo distillation at reduced pressure, although some loss through degradation did occur during the distillation. The overhead distillate of alpha-acetoxyglutaronitrile derivative weighed 80 grams corresponding to 53% mole yield of applied acrolein to the acetoxy derivative of alpha-hydroxyglutaronitrile.

*Example VIII.—Alpha-Hydroxyglutaronitrile*

The reaction was effected as in Example V, using a solvent phase of dioxane plus 5% water. After addition of the alkoxide catalyst the mixture was brought to reflux for 90 minutes at 75° to 85° C. A sample was evaporated at reduced pressure and an infrared spectrum of the residue showed the characteristics of alpha-hydroxyglutaronitrile. The catalyst was neutralized with acid and the whole product mixture was concentrated at reduced pressure to obtain the solvent-free product. This was acetylated with acetic anhydride and distilled to obtain the derivative boiling about 145–150° C. at 3 mm. (uncorrected). The overhead distillate was 82 grams corresponding to a yield of 54% mole of applied acrolein to the acetoxy derivative of alpha-hydroxyglutaronitrile.

*Example IX.—Alpha-Hydroxyglutaronitrile*

The reaction was effected similarly to Example V using tert-butyl alcohol plus 15% water as solvent phase and potassium tert-butoxide catalyst. The mix was warmed to about 60° for 15 minutes and then refluxed for 35 minutes. The catalyst was neutralized with acid and the solvent removed at reduced pressure. The product weighed 109 grams (theory=110 grams) and the infrared spectrum corresponded to that for alpha-hydroxyglutaronitrile. The product identity was established further by acetylating to give the acetoxy derivative which was distilled overhead at reduced pressure to give 105 grams of the alpha-acetoxy derivative, corresponding to 69% mole yield of applied acrolein to alpha-hydroxyglutaronitrile. The acetoxy derivative was confirmed also by comparison of the infrared spectrum with that obtained for the sample prepared by an independent synthesis.

*Example X.—Alpha-Hydroxyglutaronitrile*

The reaction was effected substantially as in Example IX using tert-butyl alcohol containing 5% water except that the reactants were brought directly to reflux after the catalyst addition. The reflux period was 40 minutes at 71° to 78° C. The concentrated product weighed 110 grams and the infrared spectrum corresponded to that for alpha-hydroxyglutaronitrile. The distilled acetoxy derivative was obtained showing that an overall yield from acrolein to the acetoxy derivative corresponded to a yield of 68% mole acrolein to alpha-hydroxyglutaronitrile.

*Example XI.—Alpha-Hydroxyglutaronitrile*

Triethylamine catalyst (3 ml.) solution in 50 ml. of substantially anhydrous toluene was run into a reactor charge comprising 450 ml. of substantially anhydrous toluene, 107 ml. HCN, and one mole of acrolein. The mix was heated to reflux for 25 minutes at 61° to 66° C. at which point acetic anhydride was added to acetylate the product for analytical purposes. Distillation at reduced pressure resulted in an overhead cut of alpha-acetoxyglutaronitrile derivative corresponding to a yield of 35% mole from applied acrolein to alpha-hydroxyglutaronitrile.

*Example XII.—Alpha-Hydroxyglutaronitrile*

As in Example XI, the reaction was effected in substantially anhydrous monochlorobenzene solvent using triethylamine catalyst. The mix was refluxed for one hour at 77° to 81° C. The analysis via the acetoxy derivative corresponded to a yield of 27% mole of applied acrolein to alpha-hydroxyglutaronitrile.

*Example XIII.—Alpha-Hydroxyglutaronitrile*

The reactor was charged with 300 ml. of absolute ethanol, 100 ml. of HCN and one mole of acrolein. A catalyst comprising 0.8 gram of NaCN in 200 ml. of absolute ethanol was added to the stirred mix with cooling to hold the temperature to not over 20° C. The reactants were warmed for one hour at 50–60° C. and then refluxed for 55 minutes at 69° to 74° C. The catalyst was neutralized with acid and the solvent removed at reduced pressure to yield 96.5 grams of product which exhibited the infrared spectrum of alpha-hydroxyglutaronitrile. The analysis via the acetoxy derivative (distilled) corresponded to a yield of 53% mole of applied acrolein to alpha-hydroxyglutaronitrile.

*Example XIV.—Alpha-Hydroxyglutaronitrile*

A reactor vessel fitted with a reflux condenser, thermometer, stirring blade and a feed burette was charged with 500 ml. of absolute ethanol, 87 ml. (2.2 moles) of HCN and 72 ml. of freshly prepared acrolein distillate containing one mole of acrolein. A catalyst solution comprising approximately 0.15 gram of sodium metal in 50 ml. of absolute ethanol was prepared. With the reactor vessel contents chilled to 0°–5° C. the catalyst solution was slowly introduced with the evolution of heat. The temperature was not allowed to exceed 20° C. The stirred mixture was allowed to chill and stand for one hour to insure that the initial exothermic reaction to form acrolein cyanohydrin was complete and could be safely warmed. The product was then warmed to 50°–60° C. for one hour with no evidence of any uncontrolled reaction. At this stage a sample was withdrawn and examined by gas liquid chromatography and no beta-cyanopropionaldehyde was found. The mixture was brought to reflux for 50 minutes starting at 72° and ending at 76° C. The catalyst was inactivated with one ml. of acetic acid and the ethanol removed at reduced pressure to avoid overheating the product above 40° C. The final vacuum pumping was completed at 2 mm. pressure to obtain 98 grams of product. The infrared spectrum corresponded to that for a synthesized sample of alpha-hydroxyglutaronitrile prepared independently. Additionally, the product was examined by gas liquid chromatography over an Apiezon stationary phase containing 5% w. $C_{20}$ linear dibasic acid. Alpha-hydroxyglutaronitrile does not emerge from this GLC column at all and also does not revert readily to beta-cyanopropionaldehyde and HCN. No beta-cyanopropionaldehyde was observed in this GLC analysis although samples of authentic beta-cyanopropionaldehyde were readily separated by this GLC procedure. A third analysis procedure was carried out with a small sample of this product comprising acetylating with acetic anhydride and gas liquid chromatography over a non-acidic Apiezon column. Alpha-acetoxyglutaronitrile derivative was observed by GLC by comparison with an acetylated sample of known alpha-hydroxyglutaronitrile. The final analysis of the concentrated product was then made by acetylating the entire product and distilling at reduced pressure. An overhead distillate of 88.9 grams was obtained boiling substantially in the 145°–150° C. range at 3 mm. pressure (uncorrected) corresponding to an overall yield of 58% mole of applied acrolein to the acetoxy derivative of alpha-hydroxyglutaronitrile. The infrared spectrum of the acetylated derivative corresponded to the spectrum of a sample of synthesized alpha-hydroxyglutaronitrile which had been acetylated.

*Example XV.—Alpha-Hydroxyglutaronitrile*

The reactor flask was charged with acrolein (1 mole), HCN (2.5 moles) in 500 ml. of substantially anhydrous nitrobenzene. The mix was chilled below about −10° C. and 2 grams of potassium tert-butoxide was added. An exotherm resulted which raised the temperature to 28° C. Heat was applied to come to reflux in 6 minutes at a reactor temperature of 65° C. Refluxing was continued for 20 minutes ending at 80° C. The product mixture was then directly acetylated for analytic purposes by adding acetic anhydride (150 ml.). The acetylation was carried out at 80°–83° C. for one hour. The mixture was concentrated in a falling film evaporator at reduced pressure and a crude acetylated residue of 195 grams was collected. The acetoxy derivative of alpha-hydroxyglutaronitrile was recovered by distillation at ca. 3 mm. pressure and 145°–150° C. (uncorrected). The distillate cut was 73 grams corresponding to an overall yield from acrolein to alpha-hydroxyglutaronitrile of 48%. The infrared spectrum of the derivative corresponded to that for the acetoxy derivative of alpha-hydroxyglutaronitrile.

The novel dicyanohydrin of the present invention finds important utility in the field of chemical intermediates. More specifically, alpha-hydroxyglutaronitrile is useful as a chemical intermediate in the preparation of alpha-amino acids, that is, those amino acids containing an amino (—$NH_2$) or substituted amino group on a carbon atom alpha to the carboxyl (—COOH) group. It is especially useful in the preparation of the biologically important alpha-amino derivatives of dicarboxylic acids. Certain of these amino acids are alpha-amino acids of the general formula HOOCRCH($NH_2$)COOH, in which R represents an alkyl group. The biologically important alpha-amino acids determine, in large measure, the physiological activity of plants and animals. Certain alpha-amino acids are considered essential to growth and life itself. Moreover, certain alpha-amino acids and mixtures of amino acids prepared by the hydrolysis of proteins have been found effective when taken by mouth or intravenously for the alleviation of hypoprotonemia, liver damage, gastrointestinal ulcers, muscular weakness and other biological conditions. Recognition of the clinical as well as the nutritional value of amino acids has led to increased interest in the manufacture of alpha-amino acids and mixtures of amino acids for therapeutic purposes.

Of primary importance has been the alpha-amino dicarboxylic acid, glutamic acid. Glutamic acid has long been used in the field of medicine to combat various metabolic and mental disorders. Moreover, it finds widespread use in the food industry in the form of the monosodium salt, monosodium glutamate, to enhance the flavor of various food products. Glutamic acid, for these and other uses, has heretofore primarily been obtained from natural sources such as, for example, by the acid hydrolysis of wheat gluten and sugar beet waste. The process employed for obtaining the acid from such sources is costly and results in comparatively expensive glutamic acid. Routes for synthesizing this acid from starting materials and intermediates obtained therefrom have been proposed, but such methods are disadvantageous because of relatively high cost of the starting materials and concomitant high costs of the intermediates obtained therefrom. The starting materials of the present invention and the novel intermediate obtained present a relatively inexpensive synthetic route to the synthesis of glutamic acid.

Alpha-hydroxyglutaronitrile has been converted to glutamic acid via two routes. The first route is the conversion of alpha-hydroxyglutaronitrile to the hydantoin, i.e., 5(2-cyanoethyl)hydantoin, using ammonium carbonate and then hydrolysis of the hydantoin with barium hydroxide in an autoclave to give glutamic acid. The second route is the reaction of alpha-hydroxyglutaronitrile with aqueous or anhydrous ammonia and then hydrolysis of the resultant amino dinitrile with sodium hydroxide in an autoclave to give glutamic acid. Glutamic acid has been obtained in yields of 50% or better based on applied acrolein.

It is to be understood that the invention is not to be limited to the exact details of operation or exact compounds shown and described as obvious modifications and equivalents will be apparent to one skilled in the art and the invention is, therefore, to be limited only by the scope of the appended claims.

We claim as our invention:

1. The process of preparing alpha-hydroxyglutaronitrile from acrolein comprising reacting one equivalent of acrolein and at least two equivalents of cyanide ion provided by compounds selected from the group consisting of HCN and the alkali metal cyanides in a solvent medium having at least 2% by weight of water contained therein, said medium having its pH maintained between 12 and 12.5 and having its temperature maintained between 20 and 100° C., thereafter neutralizing the reacted mixture in a reservoir, said reservoir having its pH maintained between 4 and 6, and subsequently separating the alpha-hydroxyglutaronitrile from the crude.

2. The process defined in claim 1 in which alkali metal alkoxide is present in catalytic amount.

References Cited in the file of this patent

UNITED STATES PATENTS

| | | |
|---|---|---|
| 2,188,340 | Dykstra | Jan. 30, 1940 |
| 2,379,297 | Harmon et al. | June 26, 1945 |
| 2,786,073 | Stansbury et al. | Mar. 19, 1957 |

OTHER REFERENCES

Lespieux, C.A.: 17, 1923, page 1954.